(12) United States Patent
Pruitt et al.

(10) Patent No.: US 11,744,402 B2
(45) Date of Patent: Sep. 5, 2023

(54) DEVICE FOR CONVERSION OF A KAMADO COOKER TO A PIZZA OVEN

(71) Applicant: Align Machine Works, LLC, Athens, GA (US)

(72) Inventors: Joseph Pruitt, Athens, GA (US); Jeffrey Broadrick, Athens, GA (US); David Matthew Williams Hemming, Surprise, AZ (US)

(73) Assignee: Align Machine Works, LLC, Athens, GA (US)

( * ) Notice: Subject to any disclaimer, the term of this patent is extended or adjusted under 35 U.S.C. 154(b) by 0 days.

(21) Appl. No.: 17/947,701

(22) Filed: Sep. 19, 2022

(65) Prior Publication Data

US 2023/0017011 A1    Jan. 19, 2023

Related U.S. Application Data

(63) Continuation of application No. 17/316,470, filed on May 10, 2021, which is a continuation-in-part of application No. 16/265,377, filed on Feb. 1, 2019, now Pat. No. 11,026,542.

(51) Int. Cl.
*A47J 37/07* (2006.01)
*A47J 37/06* (2006.01)

(52) U.S. Cl.
CPC ....... *A47J 37/0786* (2013.01); *A47J 37/0658* (2013.01); *A47J 37/0704* (2013.01)

(58) Field of Classification Search
CPC .... A47J 37/06; A47J 37/0623; A47J 37/0658; A47J 37/0664; A47J 37/07; A47J 37/0704; A47J 37/0709; A47J 37/0718; A47J 37/0727; A47J 37/0759; A47J 37/0763; A47J 37/0786
USPC ........... 99/339, 340, 422, 447–449; 126/1 R, 126/19 R, 19.5, 21 A, 25 R, 27, 30, 39 K, 126/40, 273 R, 345, 552
See application file for complete search history.

(56) References Cited

U.S. PATENT DOCUMENTS

| | | |
|---|---|---|
| D262,178 S | 12/1981 | Barber |
| D429,952 S | 8/2000 | Cragg |
| D430,991 S | 9/2000 | Cragg |
| 6,929,001 B2 | 8/2005 | Yoon |
| D545,124 S | 6/2007 | Hawkins |
| 9,237,828 B2 | 1/2016 | Walters |
| D766,037 S | 9/2016 | Johnston |
| D781,647 S | 3/2017 | Bogazzi |
| D822,435 S | 7/2018 | George |

(Continued)

*Primary Examiner* — Hung D Nguyen
(74) *Attorney, Agent, or Firm* — Smith Tempel Blaha LLC; Matthew T. Hoots

(57) ABSTRACT

Exemplary embodiments of a kamado-style cooker pizza oven conversion device are disclosed. Certain embodiments detachably mount within a kamado-styled cooker such that the lid of the cooker rests at an angle on the top of the device and thereby "closes off" and defines a cooking space within the interior that takes advantage of the pizza oven-like features of a kamado cooker. With an embodiment of the solution installed in a kamado cooker, an open doorway or window is defined for allowing a user to insert a pizza into the cooking space and place the pizza on a pizza stone held by the device. Embodiments allow for cooking to occur simultaneously via conductive, convective and radiant thermal energy transfer.

18 Claims, 8 Drawing Sheets

(56) References Cited

U.S. PATENT DOCUMENTS

| | | |
|---|---|---|
| D832,045 S | 10/2018 | Nadal |
| 10,159,381 B2 | 12/2018 | Walters |
| 2009/0078246 A1 | 3/2009 | Leavens |
| 2011/0214662 A1* | 9/2011 | Contarino, Jr. ......... A47J 37/07 |
| | | 126/25 R |
| 2013/0276643 A1 | 10/2013 | Krolick |
| 2014/0130788 A1* | 5/2014 | Contarino, Jr. ......... F24B 1/207 |
| | | 126/25 R |
| 2014/0196609 A1 | 7/2014 | Snyman |
| 2014/0287119 A1* | 9/2014 | Dahle .................... F24C 15/16 |
| | | 126/19 R |
| 2015/0157173 A1* | 6/2015 | Jepsen ................ A47J 37/0745 |
| | | 126/25 AA |
| 2016/0227965 A1* | 8/2016 | Johnston ............. A47J 37/0704 |
| 2017/0020337 A1 | 1/2017 | Borovicka |
| 2017/0164784 A1 | 6/2017 | Rummel |
| 2017/0238760 A1* | 8/2017 | Fagg ................... A47J 37/0786 |

* cited by examiner

DEVICE FOR CONVERSION OF A KAMADO COOKER TO A PIZZA OVEN

BACKGROUND

The present invention relates to outdoor cooking solutions and, more particularly, to a novel system for converting a kamado-style cooker into a pizza oven.

The best pizzas are cooked in a brick pizza oven. Brick pizza ovens, more technically termed "retained heat ovens," vary in size and design, but share some common basic features. For example, a brick pizza oven generally includes a hearth (the cooking surface, commonly made of a fire-resistant masonry) with a dome of refractory material positioned over the top. An oven landing surface leads to the interior of the pizza oven through an opening in the refractory dome. Typically, a flue is positioned near the rear of the refractory dome. The overall look of a brick pizza oven is similar to an igloo, as one of ordinary skill in the art would acknowledge.

The way a typical brick pizza oven is designed enables it to leverage radiant, conduction and convection heat transfer to achieve a very efficient, heat-balanced cooking environment. A fire is built and maintained on the hearth itself until the hearth and refractory dome are completely heated throughout. A pizza is placed directly on the hearth and is cooked, usually very quickly, as a result of being in direct contact with the hearth (conduction), proximate to the fire and the hot refractory dome (radiation), and exposed to hot air circulating through the dome-shaped oven by virtue of the flue.

Advantageously, kamado-style cookers incorporate some of the same geometry as a typical brick pizza oven, namely, a dome-shaped interior defined by a ceramic top (i.e. a refractory dome) that is fitted with a damper (i.e., a flue). Consequently, users of kamado-style cookers commonly place a "pizza stone" on the cooking grates of their grills in order to create a sort of hearth for cooking a pizza. While such an approach provides for use of a kamado-style cooker to cook a pizza, the solution is less than optimal for at least the reason that the cooker top has to be opened to access the pizza and closed to cook the pizza. And, as one of ordinary skill in the art of kamado-style cookers would acknowledge, opening and closing the top of a kamado-style cooker allows for the uncontrolled escape of thermal energy, thereby working against the goal of creating a thermally balanced cooking environment akin to a pizza oven.

Therefore, there is a need in the art for a system and device that addresses the shortcomings of the prior art, such as those outlined above, and provides for a user of a kamado-style cooker to create a cooking environment that more closely approximates a traditional brick pizza oven.

SUMMARY

Exemplary embodiments of a kamado-style cooker pizza oven conversion device are disclosed. Certain embodiments are configured to be detachably mounted within a kamado-styled cooker such as, but not limited to, a KamadoJoe® or Big Green Egg® ceramic cooker. When mounted in a kamado cooker, an embodiment of the solution will seat in the body of the cooker on its lower edge and receive the lid of the cooker to seat on its upper edge. In this way, embodiments of the solution provide a way for the lid of a cooker to rest at an angle on the top of the device and "close off" and define a cooking space within the interior that takes advantage of the pizza oven-like features of a kamado cooker. With an embodiment of the solution installed in a kamado cooker, an open doorway or window is defined for allowing a user to insert a pizza into the cooking space and place the pizza on a pizza stone held by the device and suspended over heat source in the body of the cooker (e.g., a charcoal fire).

An exemplary embodiment of a kamado-style cooker pizza oven conversion device according to the solution has a substantially vertical surface comprising an upper edge and a lower edge and defining an outer diameter and an inner diameter. The upper edge defines a first plane that intersects a second plane defined by the lower edge (thereby generating an overall wedge-like appearance when viewed from its side, however, from a top view the device may appear substantially circular). A thermal energy and smoke distribution structure resides within the inner diameter of the substantially vertical surface and further defines an innermost diameter. A plurality of pizza stone support tabs extend from the thermal energy and smoke distribution structure into a space defined by the innermost diameter. Similarly, a plurality of heat deflector support tabs extend from the thermal energy and smoke distribution structure into the space defined by the innermost diameter and beneath the pizza stone support tabs. An open doorway is provided in the substantially vertical surface for receiving a pizza and providing a user access to the cooking space within the device/cooker combination. The cooking space is defined when the lower edge of the exemplary embodiment is seated along the top edge of a body portion of the kamado-style cooker and a lid portion of the kamado-style cooker is seated on the upper edge of the exemplary device because the body portion of the cooker, the lid portion of the cooker and the substantially vertical surface of the exemplary embodiment cooperate to define an enclosed cooking space such that a food item may be inserted into the enclosed cooking space through the open doorway. To prevent the exemplary embodiment from shifting or sliding within the body of the cooker, a lower lip extending beneath the lower edge and configured to nest within the body portion of the kamado-style cooker may be included.

The exemplary embodiment may further include a removable pizza stone seated on the plurality of pizza stone support tabs (i.e., the removable pizza stone sits or rests on the tabs such that it is suspended over the thermal energy and smoke source) and a heat deflector plate seated on the plurality of heat deflector plate support tabs. The heat deflector plate may be comprised of multiple pieces, such as semi-circular halves, and may be removable. The thermal energy and smoke distribution structure within the exemplary embodiment may comprise one or more ports configured to allow thermal energy and smoke to rise through the structure (and thereby come into contact with a pizza on the pizza stone). The exemplary embodiment may also include a heat shield feature extending over the open doorway, the lower surface of which may be defined by an oven landing feature. The exemplary embodiment may also include one or more handles extending outward from the outer diameter of the substantially vertical surface (i.e., on the exterior of the device) and, further, may include one or more cutout features positioned along the innermost diameter of the thermal energy and smoke distribution structure. The exemplary embodiment may further include a vertical backstop feature positioned along the innermost diameter defined by the thermal energy and smoke distribution structure (for preventing a pizza from being inadvertently pushed off the back of the pizza stone).

DETAILED DESCRIPTION

Various embodiments, aspects and features of the present invention encompass a device and method for conversion of a kamado-style cooker (e.g., a KamadoJoe® cooker or a Big Green Egg® cooker) into a pizza oven.

In this description, the terms "kamado cooker," "kamado-style cooker" and the like are used interchangeably to refer to a cooker device commonly used for grilling and smoking food and constructed from a ceramic and/or a refractory material and/or a terra cotta clay and/or a composition of cement and lava rock. A common feature of a kamado cooker is that the overall shape is ovoid or "egg-like" such that the lid of a typical kamado-style cooker defines a domed interior space over a cooking grate. Notably, even though embodiments of the solution are described and illustrated in this description within the context of a "typical" kamado-style cooker having an ovoid body and ceramic materials of construction, it is envisioned that embodiments of the solution may be implemented in association with other barbecue grill designs such as, but not limited to, a kettle-styled grill (e.g., a Weber® grill) and, as such, it will be understood that the scope of the solution disclosed herein is not limited to application with a traditional or typical kamado-style cooker.

Also, in this description, the term "pizza oven" is used to refer to a category of retained heat ovens, often of a permanent installation, commonly used for cooking pizzas, flatbreads, and the like. As would be understood by one of ordinary skill in the art of pizza ovens, a typical pizza oven includes a cement-based hearth surface upon which both a fire is fueled and food is cooked. An open "mouth" with a landing provides access to the hearth surface over which a dome of refractory material defines an interior cooking space. A flue integrated into the dome draws cool air into the cooking space from the mouth and, in turn, the air becomes heated as it circulates within the oven and around the food before exiting through the flue. As would be understood by one of ordinary skill in the art of pizza ovens, the temperature of a pizza oven may be controlled by a combination of fueling the fire on the hearth surface and damping the circulating air flow. As will become clear from a review of the attached illustrations and the following description, embodiments of the solution provide for conversion or modification of a kamado-style cooker into an oven that incorporates features and functionality typically found in pizza ovens.

In this description, use of the term "pizza" is not meant to suggest that embodiments of the solution are limited in application to cooking a pizza. As such, it will be understood that the use of "pizza" in this description is in a general manner and meant to refer to any food prepared by baking.

Figure 1:
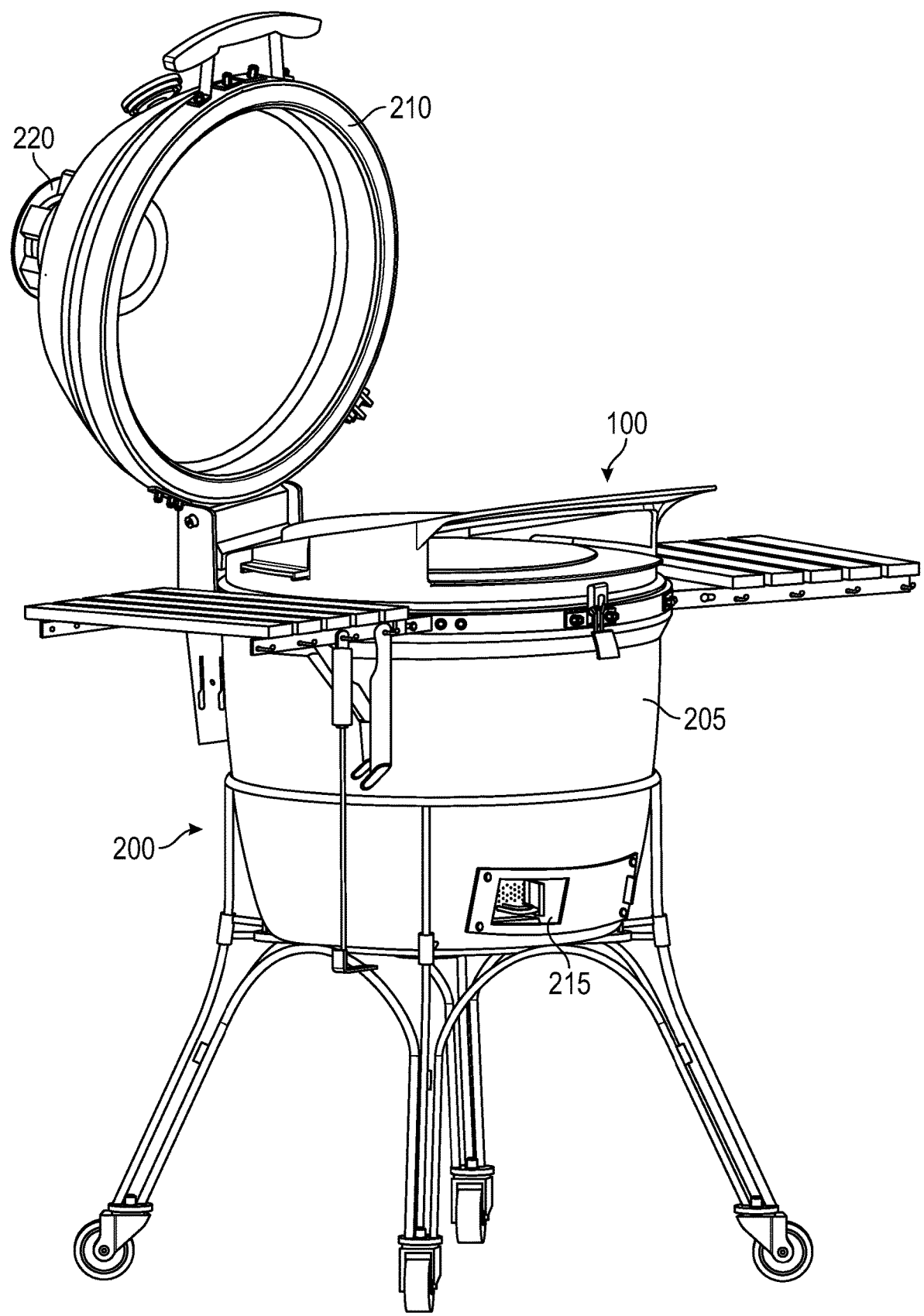
FIG. 1 illustrates an exemplary embodiment of a kamado cooker pizza oven conversion device according to the solution, shown installed on a kamado cooker with an open lid.

FIG. 1 illustrates an exemplary embodiment of a kamado cooker pizza oven conversion device 100 according to the solution, shown installed on a kamado cooker 200 with an open lid 210. As can be understood from the FIG. 1 illustration, with the lid 210 of the cooker 200 open, the device 100 may be seated or nested within the main body 205 of the cooker 200 such that the device 100 is positioned over a thermal energy and smoke source, such as a pile of combusting charcoal briquettes, located within the body 205 of cooker 200, as would be understood by one of ordinary skill in the art. As will be better seen and understood from subsequent figures, the device 100 may be configured to suspend a pizza stone, or some other plate or cooking surface, as well as a heat deflector plate in some embodiments, over and above the aforementioned fire source.

Figure 2A:
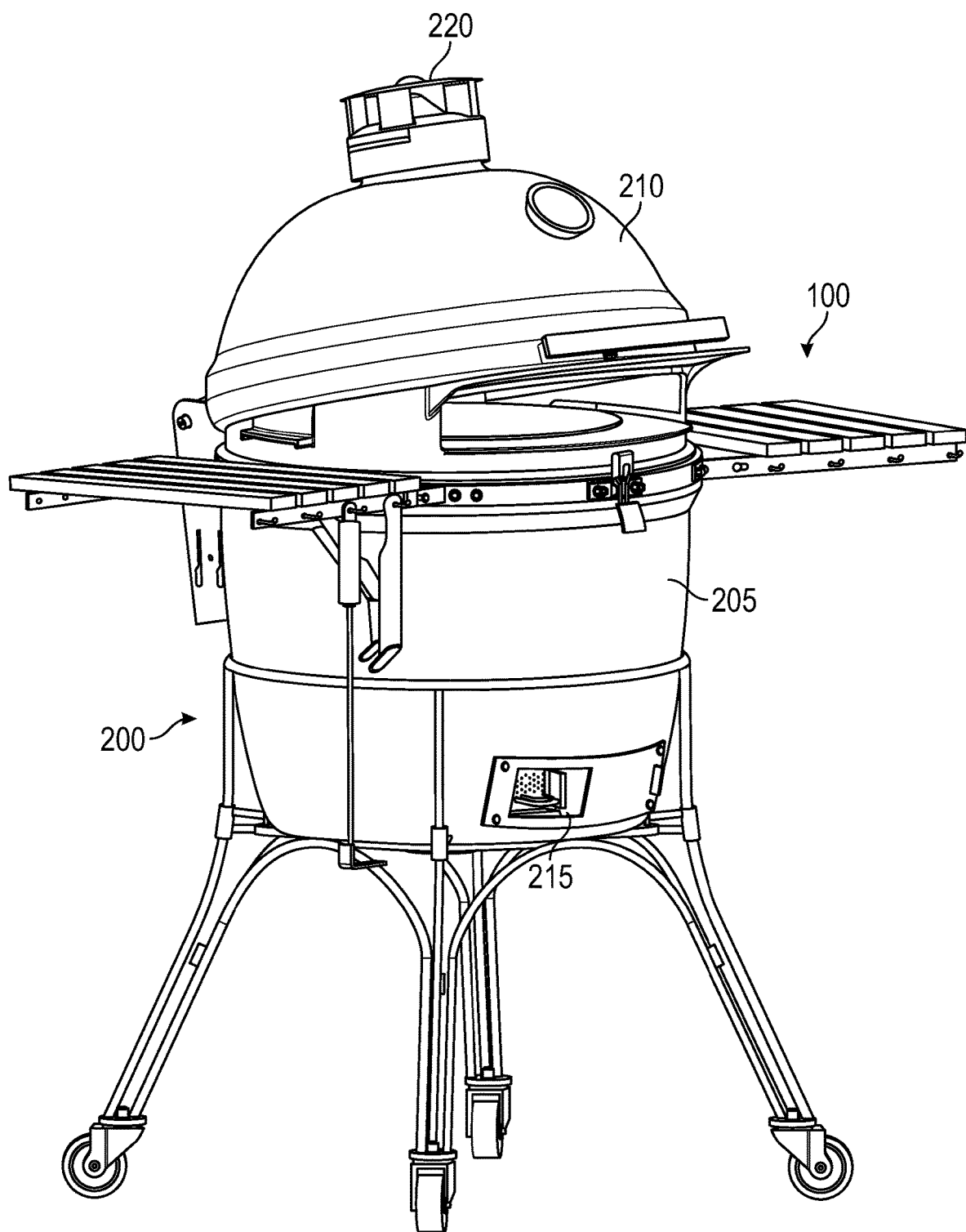
FIG. 2A illustrates the exemplary embodiment shown in FIG. 1, with the lid of the kamado cooker closed down onto the conversion device.
Figure 5:
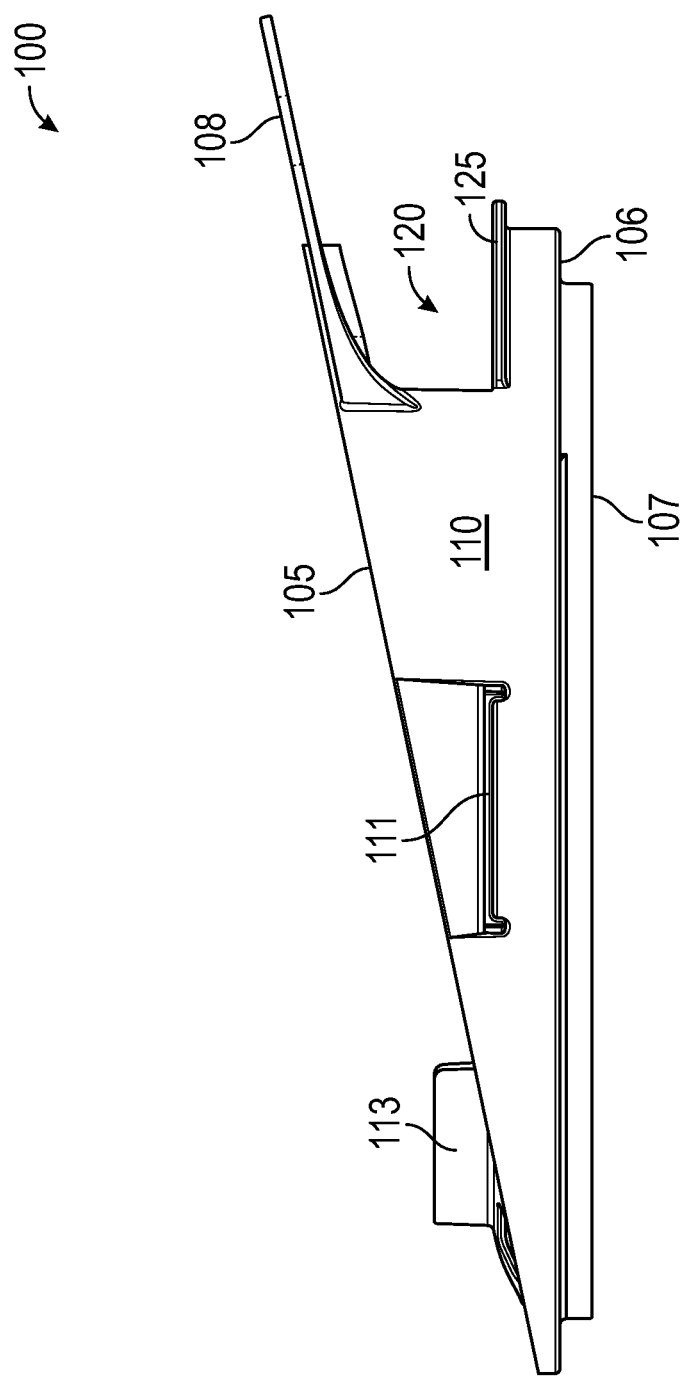
FIG. 5 is a left-side, elevation view of the exemplary embodiment of a kamado cooker pizza oven conversion device of FIG. 1.

Turning now to the FIG. 2A illustration, the exemplary embodiment shown in FIG. 1 can be seen with the lid 210 of the kamado cooker 200 closed down onto the conversion device 100 such that the lid 210 is seated along a top surface or lip of the device 100. In this state, it is advantageous that the device 100 gives a user access to the interior cooking space via a "mouth" or "window" or "doorway" (more clearly understood from the FIG. 5 illustration). The body 205 of the cooker 200 accommodates the thermal energy source such that heat and smoke rise up toward the device 100 by virtue of being urged with air flow through damper 215 and mouth 120 and out flue 220. As the thermal energy and smoke rise, the pizza stone suspended by device 100 heats up and provides a means for conducting thermal energy to any food (such as a pizza) located on the top of the pizza stone. The pizza stone is similar to the hearth of a pizza oven, as would be understood by one of ordinary skill in the art.

Moreover, and as will be better understood from subsequent figures and the related description, additional heat and smoke is allowed to pass through a series of distribution ports 123 around the perimeter of the device 100 such that air entering through the mouth of the device 100 may be heated and combined with the smoke as it circulates within the dome-shaped cooking space defined by the kamado cooker lid 210 to provide a convective source of cooking energy (notably, and advantageously, thermal energy radiating from the lid 210 may contribute to heating of circulating air in the cooking space).

Figure 2B:
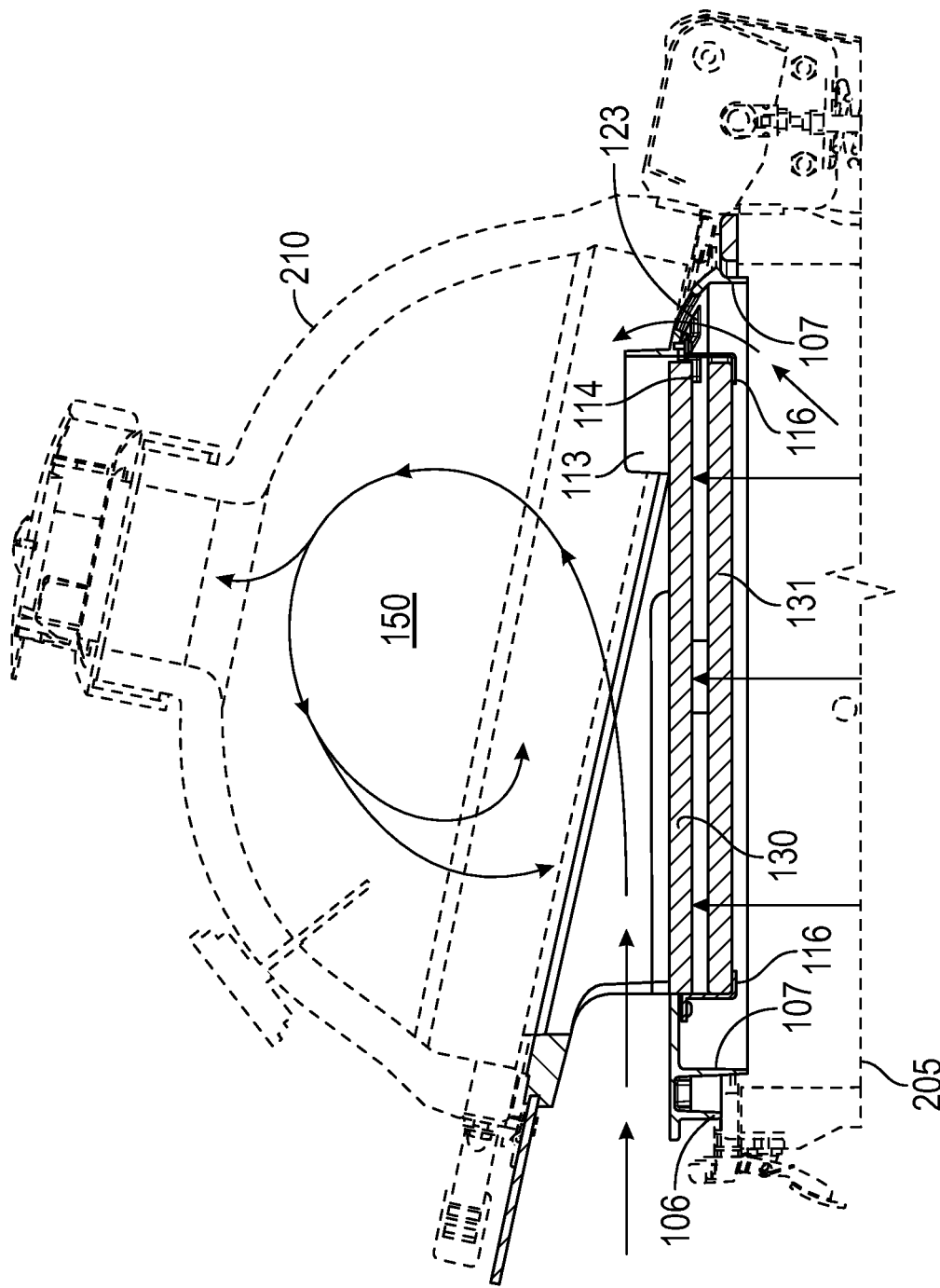
FIG. 2B illustrates a close-up, sectional view of the FIG. 2A illustration to demonstrate thermal energy and smoke management when an embodiment of the solution is coupled to a kamado-style cooker.

Further, and as can be seen and understood from the FIGS. 2A and 2B illustrations, the device 100 prevents the lid 210 from closing onto body 205 but, rather, provides a seating surface for receiving the lid 210. In this way, when the lid 210 is closed down onto the device 100, the sidewalls and overall wedge shape of the device 100 work in concert with the cooker body 205 and lid 210 to define the interior cooking space over and around any pizza stone suspended in device 100. At the same time, an open access to the interior cooking space is provided through the doorway/mouth of the device 100. Advantageously, a heat shield or "duck bill" 108 (better seen in FIGS. 3-5) mitigates and diverts thermal energy emanating from the interior cooking space from any handle of lid 210. And, a lower heat deflector plate(s) 131 suspended beneath the pizza stone 130 operates to prevent the pizza stone 130 from getting too hot such that a pizza may be burned before it's completely cooked.

Referring specifically to FIG. 2B, illustrated is a close-up, sectional view of the FIG. 2A illustration to demonstrate thermal energy and smoke management when an embodiment of the solution is coupled to a kamado-style cooker. As can be seen and understood from the FIG. 2B illustration, thermal energy rising from within the body 205 of the cooker 200 passes through the lower heat deflector plate 131 before it contacts the pizza stone 130 and raises its temperature—the hot pizza stone 130 may then contribute to the cooking of a pizza atop its surface via conductive heat transfer. Advantageously, however, the heat deflector plate 131 may impede or slow thermal energy transfer so that the pizza stone 130 maintains an optimal temperature for cooking. Thermal energy and smoke also rises up and through the ports 123 of the structure 122, urged by a motive force largely attributable to leveraging of the damper 215 and the flue 220 and air pulled in through the window 120. Notably, although the FIG. 2B illustration shows air being pulled into the cooking space 150 from damper 215 and window 120 before exiting through flue 220, it is envisioned that embodiments of the solution may be used by closing off damper 215—in such a configuration, air may enter the kamado cooker through damper 215, rise up through ports 123 of structure 112, and circulate within the cooking space 150 before exiting through window 120.

Returning to the FIG. 2B illustration, the air and smoke is allowed to circulate within the cooking space 150 above the pizza stone and beneath the domed lid 210 of the cooker 200 and, in doing so, is further heated via thermal energy radiating from the body 205 and lid 210 (as would be true whether the air flow is as is depicted in the FIG. 2B illustration or as described above with flue 220 closed). The heated air and smoke, before exiting the cooking space 150 via flue 220 (or via window 120 if flue 220 is closed), also contributes to the cooking effort via a convective thermal energy transfer.

Figure 3:
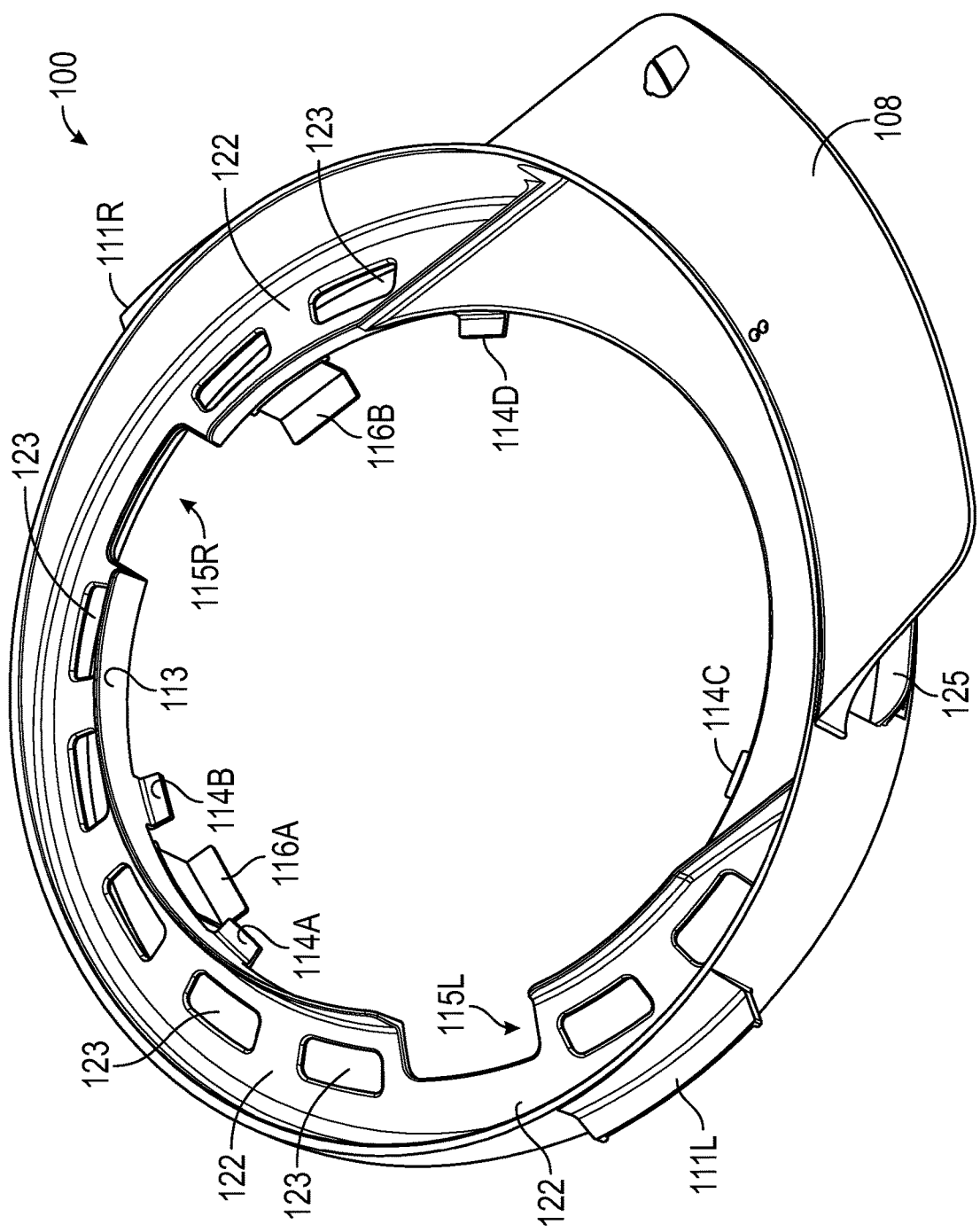
FIG. 3 is a top-side, perspective view of the exemplary embodiment of a kamado cooker pizza oven conversion device shown in FIG. 1.
Figure 4:
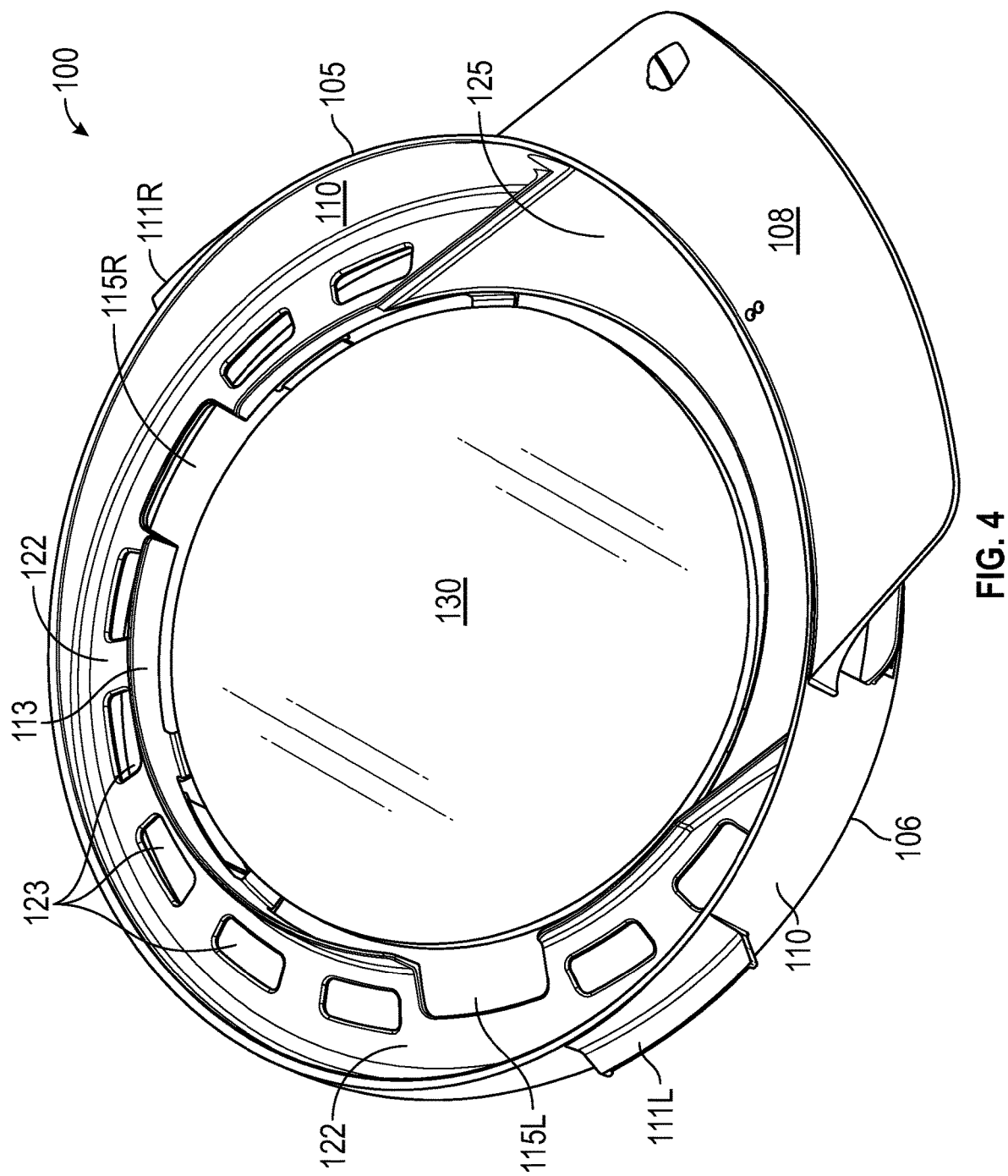
FIG. 4 is a top-side, perspective view of the exemplary embodiment of a kamado cooker pizza oven conversion device shown in FIG. 1, with a pizza stone suspended in the center space of the device.

Turning now to FIGS. 3-5, the exemplary embodiment of a kamado cooker pizza oven conversion device 100 depicted in FIGS. 1 and 2 will be shown and described in more detail. FIG. 3 is a top-side, perspective view of the device 100. FIG. 4 is a top-side, perspective view of the device 100 with a pizza stone placed/suspended in its center space. And, FIG. 5 is a left-side, elevation view of the exemplary kamado cooker pizza oven conversion device 100.

Describing the various views of the device 100 illustrated in FIGS. 3-5, it can be seen and understood that the device 100 forms an overall wedge-like shape. Advantageously, when installed in a kamado-style cooker, or some other grill or smoker, the device 100, by virtue of its wedge-like shape, positions the lid of the cooker in a partially opened state such that the sides 110 and body of the device 100 cooperate with the cooker body and lid to define an interior cooking space. To seal off the interior cooking space, the device 100 seats with the cooker body along its lower edge 106 while seating with the lid of the cooker along its upper edge 105. A lower lip 107 is configured to nest within an inner diameter defined by the cooker body to prevent the device 100 from shifting. When installed in a cooker, the lower edge 106 may be substantially parallel to the ground, as is the upper edge of the cooker body, while the upper edge 105 defines a plane that is set at an angle to the ground. The angle of the upper edge 105 defines the degree of the overall wedge-like shape of the device 100. It is envisioned that different embodiments of the solution may feature different angles and, as such, the exemplary embodiment of a kamado cooker pizza oven conversion device 100 shown in the figures will not suggest, or otherwise limit, the scope of the solution.

A pair of handle features, 111L and 111R, may be positioned on the exterior of the sidewall 110 such that the device may be easily placed in, and removed from, a cooker. Viewing the device 100 from its top, it can be seen that the device 100 takes an overall circular form (wedge-like when viewed from the side) and defines an open center area. Within the interior of the device 100, extending circumferentially, is a smoke and thermal energy distribution structure 122 that includes a plurality of ports 123. Extending further into the center area from the innermost diameter defined by the smoke and thermal energy distribution structure 122 is a series of pizza stone support tabs 114A, 114B, 114C and 114D. Notably, although the exemplary embodiment includes four pizza stone support tabs 114, it is envisioned that other embodiments of the solution may include more, or less, than four tabs 114. Also extending into the center area from the innermost diameter defined by the smoke and thermal energy distribution structure 122 is a series of heat deflector plate(s) support tabs 116 (tabs 116A and 116B can be seen in the FIG. 3 illustration). The heat deflector support tabs 116 are lower than, or beneath, the pizza stone support tabs 114 such that a heat deflector plate(s) placed on the support tabs 116 will be positioned beneath a pizza stone placed on the support tabs 114.

When in use, a pizza stone 130, or some other cooking surface, may rest on the support tabs 114 such that it is suspended over a heat deflector plate 131 that is, in turn, suspended over a thermal energy and smoke source (e.g., a combusting charcoal pile) in the cooker body 205. When installed in this way, the pizza stone 130 functions similar to a hearth in a traditional pizza oven. It is an advantage of embodiments of the solution that the pizza stone 130 is suspended over the heat source (and the deflector plate(s) 131, if present) without having to rest on a cooking grate. The pizza stone 130 may be easily grasped and removed via one or more cutout features 115L and 115R in the structure 122.

The device 100 further comprises an oven landing feature 125 and a heat shield 108. The oven landing feature 125 forms the lower surface of an open mouth or open door 120 while the heat shield 108 extends out over the open door 120. Advantageously, a pizza or some other food item may be inserted into the cooking space, and rested on the pizza stone 130, by and through the open door 120. Also, cool air may be drawn into the cooking space through doorway 120, circulated within the cooking space to absorb heat, and expelled through the flue 220 of the cooker 200. Alternatively, with flue 220 closed or sufficiently dampened, cool air may be drawn in through the damper in the cooker body, heat up and rise into the cooking space through ports 123, circulate in the cooking space, and exit through doorway 120.

At the rear of the open middle space defined by the smoke and thermal energy distribution structure 122 for accommodating the pizza stone 130 and deflector plate(s) 131, the device 100 may include a vertical backstop feature 113 useful for preventing a user from pushing a pizza or other food item off the back of the pizza stone 130. With the device 100 installed in a cooker 200 (with the cooker lid 210 seated along the top edge 105 of the device 100), and a pizza stone 130 in place resting on the tabs 114, thermal energy and smoke generated from within the cooker body 205 may rise up and through the various ports 123 in the smoke and thermal energy distribution structure 122. Thermal energy may also be transferred by and through the heating of the pizza stone 130. With thermal energy conducting through the pizza stone 130, and thermal energy and smoke rising up through the ports 123 to enter the cooking space defined by the device 100 and dome lid 210, and doorway 120 providing user access to any pizza or other food residing on pizza stone 130, the device 100 provides for a kamado-style cooker to function and perform like a traditional pizza oven.

Figure 6:
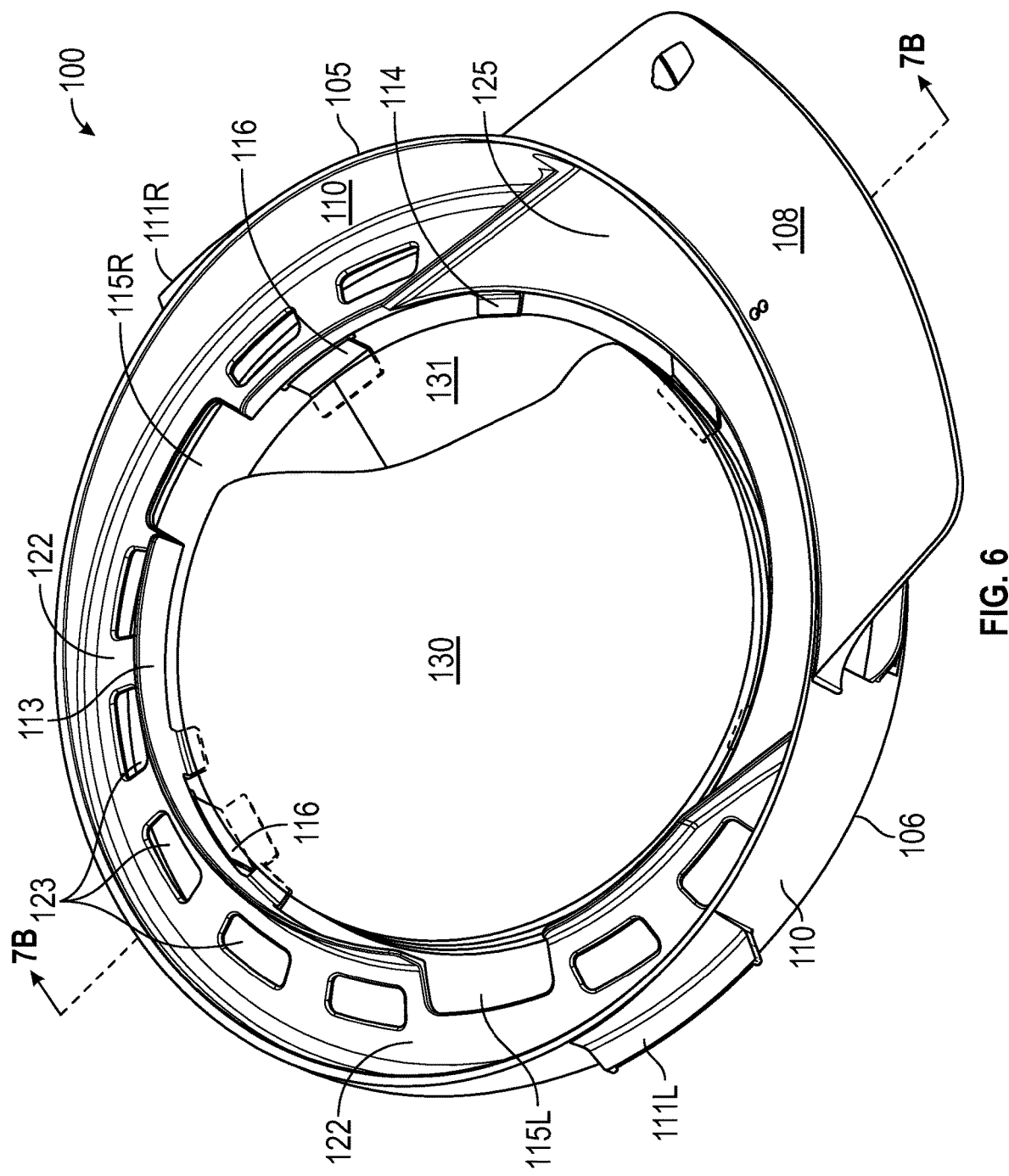
FIG. 6 is the view of a kamado cooker pizza oven conversion device shown in the FIG. 4, illustrated with a portion of the pizza stone cutaway to show a lower heat deflector plate.
Figure 7A:
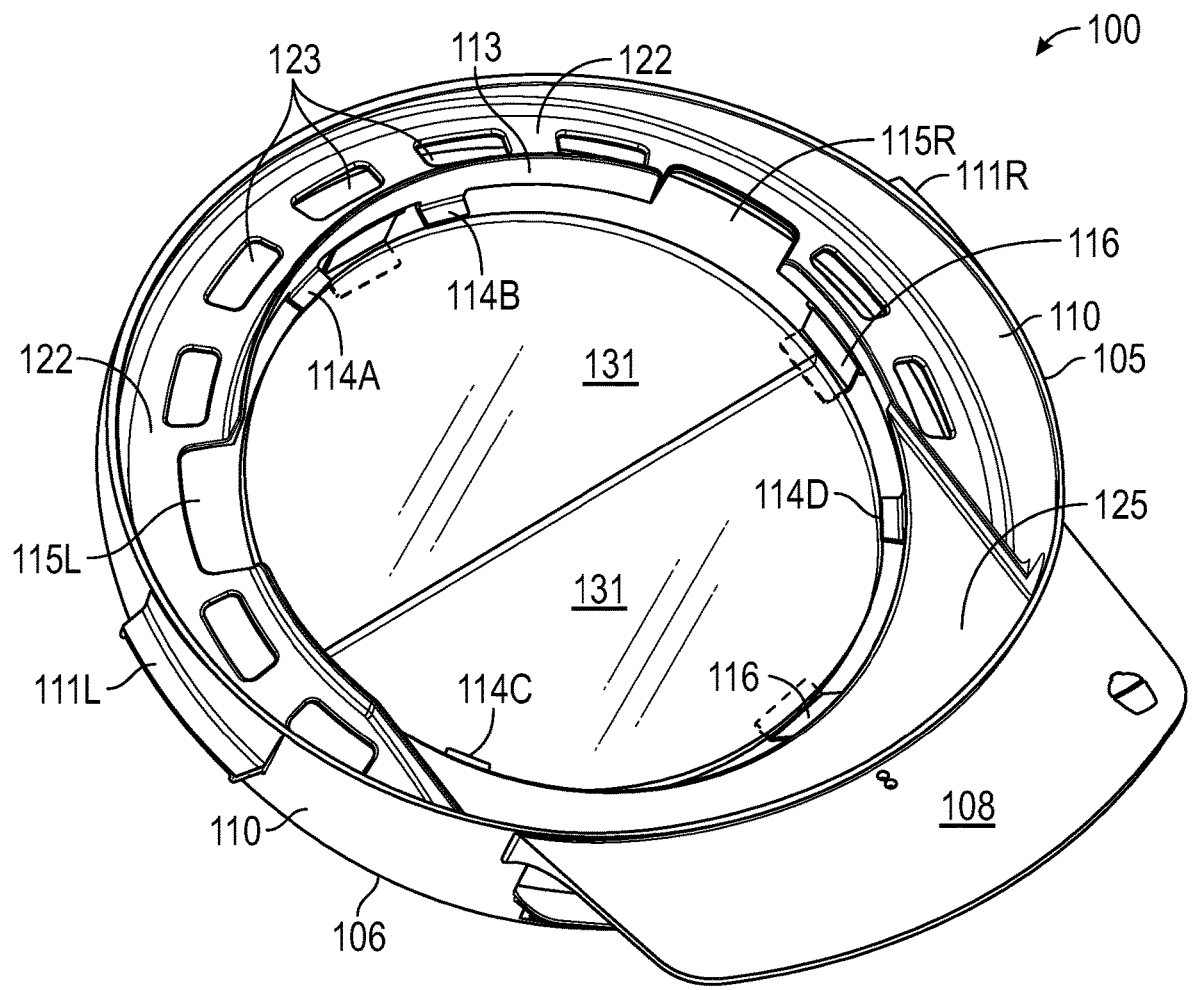
FIG. 7A is the view of a kamado cooker pizza oven conversion device shown in the FIG. 4, illustrated with the pizza stone removed to fully expose a lower heat deflector plate.
Figure 7B:
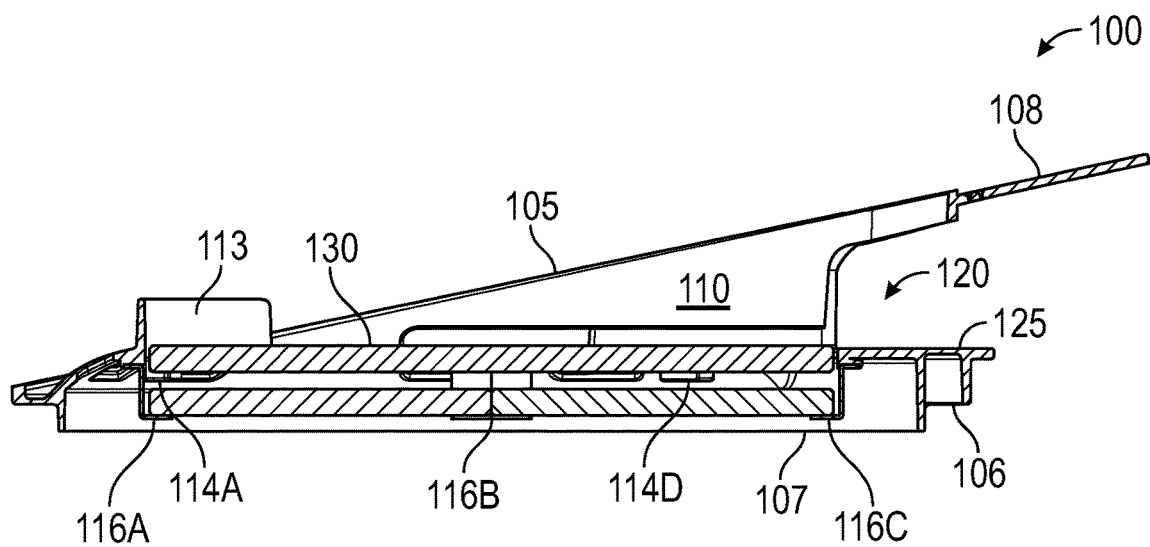
FIG. 7B is a sectional view of the FIG. 6 illustration to demonstrate the spatial relationship of the pizza stone with the lower heat deflector plate.

Turning now to FIGS. 6, 7A and 7B, the exemplary embodiment of a kamado cooker pizza oven conversion device 100 depicted in the previous figures will be shown and described in a little more detail. FIG. 6 is the view of a kamado cooker pizza oven conversion device 100 shown in the FIG. 4, illustrated with a portion of the pizza stone 130 cutaway to show a lower heat deflector plate 131. FIG. 7A is the view of a kamado cooker pizza oven conversion device 100 shown in the FIG. 4, illustrated with the pizza stone 130 removed to fully expose the lower heat deflector plate 131. And, FIG. 7B is a sectional view of the FIG. 6 illustration to demonstrate the spatial relationship of the pizza stone 130 with the lower heat deflector plate 131.

As can possibly be best understood from the FIGS. 6, 7A and 7B illustrations, the lower heat deflector plate 131 may be in the form of two sections. Whether a single piece, or multiple sections, the heat deflector plate 131 seats on top of a series of support tabs 116, as previously described. The support tabs 116 present a seating surface for the heat deflector plate(s) 131 that is lower than, or beneath, the seating surface presented by support tabs 114 for pizza stone 130. It is envisioned that the heat deflector plate 131 may be in the form of sections, shown semi-circular in the exemplary embodiment, so that it can be easily and efficiently removed and installed into the device 110 beneath tabs 114. Advantageously, and as previously explained, the heat deflector plate(s) 131 present a thermal barrier between the thermal energy source and the pizza stone 130 such that the pizza stone may not overheat to such an extent that it is no longer optimal for cooking. Even so, the scope of the solution is not limited such that all embodiments of a device 100 will necessarily include a heat deflector plate(s) 131.

A kamado-style cooker pizza oven conversion device according to the solution has been described using detailed descriptions of embodiments thereof that are provided by way of example and are not intended to limit the scope of the disclosure. The described embodiments comprise different features, not all of which are required in all embodiments of a kamado-style cooker pizza oven conversion device according to the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that a kamado-style cooker pizza oven conversion device according to the solution is not limited by what has been particularly shown and described herein above. Rather, the scope of a kamado-style cooker pizza oven conversion device according to the solution is defined by the claims that follow.

What is claimed is:

1. A kamado-style cooker pizza oven conversion device, comprising:
   a substantially vertical surface comprising an upper edge and a lower edge and defining an outer diameter and an inner diameter, and a lower lip, wherein:
   an open doorway is defined in the substantially vertical surface,
   the upper edge defines a first plane that intersects a second plane defined by the lower edge such that the kamado-style cooker pizza oven conversion device defines an overall wedge-like shape that is operable to fit between a body portion of a kamado-style cooker and a lid portion hinged to the body portion, when the lower edge is seated on the top edge of the body portion and the hinged lid portion is seated on the upper edge;
   the lower edge consists of a substantially flat surface having a width that is equal to or less than a width of a gasket associated with the top edge of the body portion of the kamado-style cooker;
   the lower lip is configured to nest within the body portion of the kamado-style cooker; and
   when the lower edge is seated on the top edge of the body portion of the kamado-style cooker and the hinged lid portion of the kamado-style cooker is seated on the upper edge, the body portion, lid portion and substantially vertical surface define an enclosed cooking space such that a food item may be inserted into the enclosed cooking space through the open doorway; and
   a pizza stone positioned within the enclosed cooking space.

2. The kamado-style cooker pizza oven conversion device of claim 1, wherein the kamado-style cooker pizza oven conversion device further comprises a plurality of pizza stone support tabs extending into the enclosed cooking space.

3. The kamado-style cooker pizza oven conversion device of claim 1, wherein the kamado-style cooker pizza oven conversion device further comprises a thermal energy and smoke distribution structure residing within the inner diameter of the substantially vertical surface and further defining an innermost diameter.

4. The kamado-style cooker pizza oven conversion device of claim 3, wherein the kamado-style cooker pizza oven conversion device further comprises a plurality of heat deflector plate support tabs extending from the thermal energy and smoke distribution structure into the space defined by the innermost diameter and beneath the pizza stone support tabs.

5. The kamado-style cooker pizza oven conversion device of claim 4, further comprising a heat deflector plate seated on the plurality of deflector plate support tabs.

6. The kamado-style cooker pizza oven conversion device of claim 5, wherein the heat deflector plate is comprised of two pieces.

7. The kamado-style cooker pizza oven conversion device of claim 1, further comprising a heat shield feature extending over the open doorway.

8. The kamado-style cooker pizza oven conversion device of claim 1, wherein the kamado-style cooker pizza oven conversion device further comprises an oven landing defining a lower surface of the open doorway, the oven landing residing within the inner diameter.

9. The kamado-style cooker pizza oven conversion device of claim 1, wherein the kamado-style cooker pizza oven conversion device further comprises a vertical backstop feature configured to assist manipulation of a food item residing on the pizza stone.

10. The kamado-style cooker pizza oven conversion device of claim 1, wherein the kamado-style cooker pizza oven conversion device further comprises a lower lip extending beneath the lower edge and configured to nest within the body portion of the kamado-style cooker.

11. A kamado-style cooker pizza oven system, the system comprising:
- means for defining a cooking space within a kamado-style cooker such that a hinged lid of the kamado-style cooker is seated at an angle relative to a lower body portion of the kamado-style cooker;
- means for defining an innermost diameter;
- means for supporting a pizza stone within a space defined by the innermost diameter;
- means for providing access to the cooking space such that the lid remains seated;
- means for seating along the top edge of a body portion of a kamado-style cooker; and
- means for nesting within the body portion of the kamado-style cooker such that the system is prevented from shifting during use.

12. The kamado-style cooker pizza oven system of claim 11, further comprising means for distributing thermal energy and smoke within the inner diameter of the substantially vertical surface and further defining an innermost diameter.

13. The kamado-style cooker pizza oven system of claim 11, further comprising means for supporting a heat deflector plate beneath the pizza stone.

14. The kamado-style cooker pizza oven system of claim 13, further comprising a heat deflector plate seated on the means for supporting a heat deflector plate beneath the pizza stone.

15. The kamado-style cooker pizza oven system of claim 14, wherein the heat deflector plate is comprised of two pieces.

16. The kamado-style cooker pizza oven system of claim 11, further comprising a means for shielding a user from thermal energy emanating from the open doorway.

17. The kamado-style cooker pizza oven system of claim 11, further comprising a means for an oven landing within the open doorway.

18. The kamado-style cooker pizza oven system of claim 11, further comprising a means for a vertical backstop feature configured to assist manipulation of a food item residing on the pizza stone.

* * * * *